US011827750B2

(12) United States Patent
Sakai et al.

(10) Patent No.: US 11,827,750 B2
(45) Date of Patent: Nov. 28, 2023

(54) TRIAZINE RING-CONTAINING POLYMER, AND THERMOPLASTIC RESIN, ARTICLE, AND OPTICAL PART INCLUDING SAME

(71) Applicants: SAMSUNG ELECTRONICS CO., LTD., Suwon-si (KR); Osaka Gas Chemicals Co., Ltd., Osaka (JP)

(72) Inventors: Nobuji Sakai, Kanagawa-ken (JP); Hiroko Endo, Kanagawa-ken (JP); Yukika Yamada, Kanagawa-ken (JP); Eigo Miyazaki, Hwaseong-si (KR); Rie Yasuda, Osaka (JP); Shinsuke Miyauchi, Osaka (JP)

(73) Assignees: SAMSUNG ELECTRONICS CO., LTD., Gyeonggi-Do (KR); OSAKA GAS CHEMICALS CO., LTD., Osaka (JP)

( * ) Notice: Subject to any disclaimer, the term of this patent is extended or adjusted under 35 U.S.C. 154(b) by 65 days.

(21) Appl. No.: 17/186,294

(22) Filed: Feb. 26, 2021

(65) Prior Publication Data

US 2021/0269599 A1 Sep. 2, 2021

(30) Foreign Application Priority Data

Feb. 28, 2020 (JP) ................................ 2020-034092

(51) Int. Cl.
*C08G 75/0236* (2016.01)

(52) U.S. Cl.
CPC ................................ *C08G 75/0236* (2013.01)

(58) Field of Classification Search
CPC ..... C08G 73/0644; C08G 75/04; C08L 79/04; G02B 1/04; H01L 51/0067; H01L 51/0072
See application file for complete search history.

(56) References Cited

U.S. PATENT DOCUMENTS

| | | | | |
|---|---|---|---|---|
| 8,618,243 | B2 | 12/2013 | Nishimura et al. | |
| 8,710,174 | B2 | 4/2014 | Nishimura et al. | |
| 10,717,866 | B2 | 7/2020 | Oishi et al. | |
| 2013/0303516 | A1 | 11/2013 | Dugar et al. | |
| 2018/0244915 | A1 * | 8/2018 | Oishi | C08K 9/04 |

FOREIGN PATENT DOCUMENTS

| | | | |
|---|---|---|---|
| JP | 2009001658 | A | 1/2009 |
| JP | 5493148 | B2 | 5/2014 |
| JP | 2014162829 | A | 9/2014 |
| JP | 6003952 | B2 | 10/2016 |
| JP | 6100021 | B2 | 3/2017 |
| JP | 2017197466 | A | 11/2017 |
| JP | 2018138624 | A | 9/2018 |
| JP | 2018138625 | A | 9/2018 |
| JP | 6412316 | B2 | 10/2018 |

* cited by examiner

*Primary Examiner* — Shane Fang
(74) *Attorney, Agent, or Firm* — CANTOR COLBURN LLP

(57) ABSTRACT

A triazine ring-containing polymer having a high refractive index and a low birefringence, and being capable of being subjected to injection molding, wherein the polymer having a repeating unit of *-[A-B-]-*, including a structural unit A derived from a triazinedithiol compound, and a structural unit B including an aromatic hydrocarbon group; and a thermoplastic resin, a thermoplastic article, and an optical part including the polymer.

20 Claims, 1 Drawing Sheet

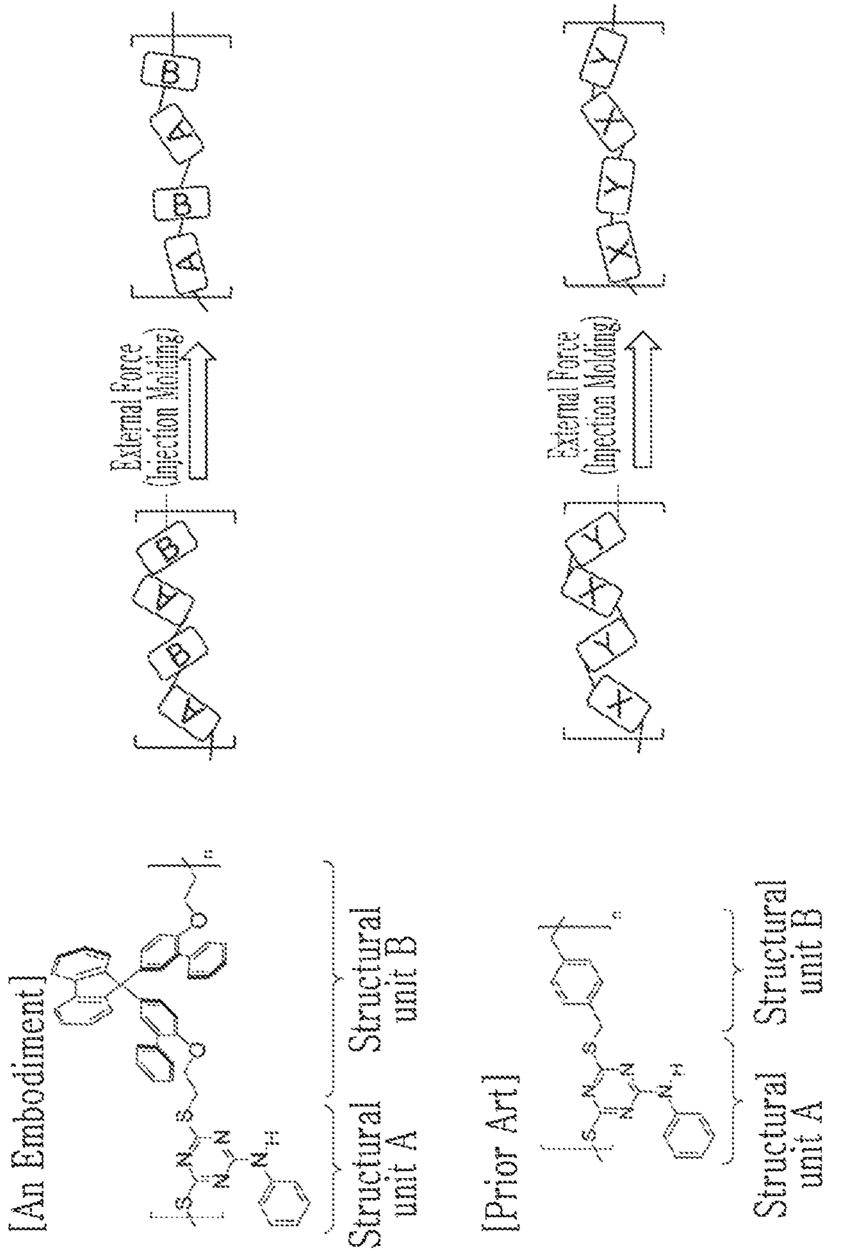
[An Embodiment]
Structural unit A
Structural unit B
[Prior Art]
Structural unit A
Structural unit B
External Force (Injection Molding)
External Force (Injection Molding)

TRIAZINE RING-CONTAINING POLYMER, AND THERMOPLASTIC RESIN, ARTICLE, AND OPTICAL PART INCLUDING SAME

CROSS-REFERENCE TO RELATED APPLICATION

This application claims priority to and the benefit of Japanese Patent Application No. 2020-034092, filed in the Japanese Intellectual Property Office on Feb. 28, 2020, and Korean Patent Application No. 10-2021-0026486, filed in the Korean Intellectual Property Office on Feb. 26, 2021, and all the benefits accruing therefrom under 35 U.S.C. § 119, the entire contents of which are incorporated herein by reference.

BACKGROUND

1. Field

A triazine ring-containing polymer, and a thermoplastic resin, an article, and an optical part including the same are disclosed.

2. Description of the Related Art

Recently, research on optical materials has been actively conducted. Examples of the optical materials may be optical lens materials used in optical systems such as camera-containing devices including cameras, video cameras, vehicle-mounted cameras, or smartphone lenses. The optical lens materials are required to have a high refractive index and a low birefringence, and simultaneously have excellent heat resistance, light transparency, and easy molding properties. Compared with glass lenses, resin (i.e., polymer) lenses are light weight, do not easily break, and cost less in terms of materials, Resin lenses may be formed into various shapes through an appropriate injection molding for lens formation. However, the thinner lenses necessary for high resolution cameras require a material having a high refractive index.

In order to obtain a polymer having a high refractive index as a resin material, attempts have been made to introduce an aromatic ring, a halogen atom, or a sulfur atom into the polymer. Particularly, an episulfide resin and a thiourethane resin prepared by introducing the sulfur atom can have a refractive index of greater than or equal to about 1.7 but lacks plasticity, which limits commercialization scope.

A triazine ring-containing polymer resin with a high refractive index and having high plasticity has been investigated. For example, Japanese Patent Laid-Open Publication No. 2014-162829 discloses a triazine ring-containing polymer including a repeating unit structure having a triazine ring, and having a refractive index of greater than or equal to about 1.7.

SUMMARY

However, the triazine ring-containing polymer disclosed in the prior art has a high birefringence and does not have sufficiently good optical properties. Therefore, there still remains a need for a material having a high refractive index and a low birefringence, and being capable of being subjected to injection molding.

An embodiment provides a triazine ring-containing polymer having a high refractive index and a low birefringence, as well as being capable of being subjected to injection molding to form an article therefrom.

The triazine ring-containing polymer includes a repeating unit represented by General Formula 1:

*-[-A-B-]-*. General Formula 1

In General Formula 1,

A is represented by General Formula 2,

B is represented by any one of General Formulae 3-1 to 3-3, and

* indicates a point linked to another group or structural unit;

General Formula 2

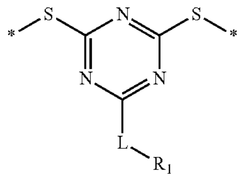

wherein, in General Formula 2,

L is a single bond or a linking group, $R_1$ is a group including an oxygen atom (O), sulfur atom (S), nitrogen atom (N), selenium atom (Se), or a combination thereof, and

* indicates a point linked to another group or structural unit;

General Formulae 3-1 to 3-3:

(3-1)

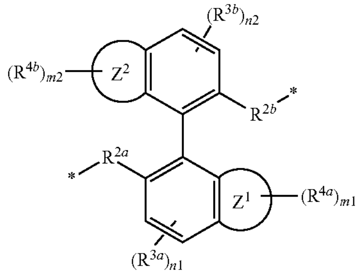

(3-2)

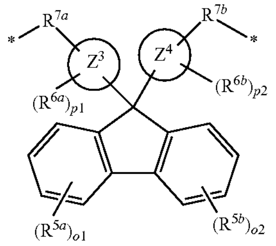

(3-3)

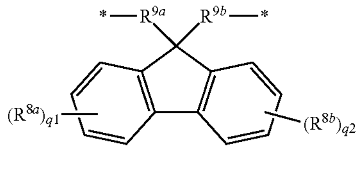

wherein, in General Formula 3-1, $R^{2a}$ and $R^{2b}$ are each independently a C1 to C10 alkylene group, or an alkylene oxide group of formula —$(O—C_mH_{2m})_n$—, wherein, m is an integer ranging from 1 to 4, and n is an integer ranging from 1 to 3, and

* indicates a point linked to another structural unit or atom;

$Z^1$ and $Z^2$ are each independently hydrogen, or a fused aromatic hydrocarbon group, wherein, $R^{3a}$, $R^{3b}$, $R^{4a}$ and $R^{4b}$ are each independently a substituent, n1 and n2 are each independently 0, 1, or 2, m1 and m2 are each independently an integer of 0, or any one of 1 to 4;

wherein, in General Formula 3-2, $Z^3$ and $Z^4$ are each independently an aromatic hydrocarbon group, $R^{5a}$, $R^{5b}$, $R^{6a}$ and $R^{6b}$ are each independently a substituent, $R^{7a}$ and $R^{7b}$ are each independently a C1 to C10 alkylene group, or an alkylene oxide group of formula —$(O—C_mH_{2m})_n$—, wherein, m is an integer ranging from 1 to 4, and n is an integer ranging from 1 to 3;

o1 and o2 are each independently an integer of 0, or any one of 1 to 4, and p1 and p2 are each independently an integer of 0, or any one of 1 to 4, and

* indicates a point linked to another structural unit or atom;

wherein, in General Formula 3-3, $R^{8a}$ and $R^{8b}$ are each independently a substituent, $R^{9a}$ and $R^{9b}$ are each independently a C1 to C10 alkylene group, or an alkylene oxide group of formula —$(O—C_mH_{2m})_n$—, wherein, m is an integer ranging from 1 to 4, and n is an integer ranging from 1 to 3, q1 and q2 are each independently an integer of 0, or any one of 1 to 4, and

* indicates a point linked to another structural unit or atom.

An embodiment provides a thermoplastic resin including the triazine ring-containing polymer.

An embodiment provides an article including the triazine ring-containing polymer.

An embodiment provides an optical part including the triazine ring-containing polymer.

The triazine ring-containing polymer according to an embodiment has a high refractive index and a low birefringence, and may be subjected to injection molding to provide an optical part.

BRIEF DESCRIPTION OF THE DRAWING

A schematic drawing that illuminates a mechanism how a birefringence becomes low in a triazine ring-containing polymer according to an embodiment.

DETAILED DESCRIPTION

Hereinafter, one or more exemplary embodiments will be described, but the technical scope of the present invention should be determined according to the description of the claims, and is not limited to the following embodiments. In this regard, the present embodiments may have different forms and should not be construed as being limited to the descriptions set forth herein. Accordingly, the embodiments are merely described below to explain aspects. As used herein, the term "and/or" includes any and all combinations of one or more of the associated listed items. Expressions such as "at least one of," when preceding a list of elements, modify the entire list of elements and do not modify the individual elements of the list.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10%, 5% of the stated value.

As used herein, when a definition is not otherwise provided, the term "aromatic hydrocarbon group" refers to a cyclic group in which all ring members are carbon and at least one ring is aromatic, the group having the specified number of carbon atoms, for example a C6 to C30 arylene group, and specifically a C6 to C18 arylene group, and having a valence of at least one. More than one ring may be present, and any additional rings may be independently aromatic, saturated, or partially unsaturated, and may be fused, pendant, spirocyclic, or a combination thereof. In general formulae and chemical structures, "*" indicates a point linked to another structural unit or atom.

As used herein, unless a special description is provided, each operation, measurement of physical properties, and the like is performed under conditions of room temperature (about 20° C. or higher, about 25° C. or lower) and a relative humidity (RH) of about 40% RH or higher and about 50% RH or lower.

As used herein, in the disclosure the term "triazine ring-containing polymer" may be simply referred to as "polymer," and the term "thermoplastic molded article" may also be simply referred to as "article."

In addition, as used herein, in the disclosure the term "divalent C6 to C30 aromatic hydrocarbon group, or an aromatic hydrocarbon linking group in which two or more C6 to C30 aromatic hydrocarbon groups are linked to each other by a single bond, a C1 to C6 alkylene group, or an atom of oxygen, sulfur, or selenium" may simply be referred to as "a divalent aromatic hydrocarbon group", or "an aromatic hydrocarbon group," or the like.

Triazine Ring-Containing Polymer

In an embodiment, the triazine ring-containing polymer includes a repeating unit resented by General Formula 1:

*-[-A-B-]-*. General Formula 1

In General Formula 1,

A (hereinafter, also referred to as "structural unit A") is represented by General Formula 2, B (hereinafter, also referred to as 'structural unit B') is represented by General Formula 3, and

* indicates a point linked to another structural unit or atom.

Structural Unit A

The structural unit A is represented by General Formula 2:

General Formula 2

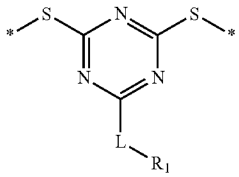

wherein, in General Formula 2, L is a single bond or a linking group. Herein, that "L is a single bond" means that the triazine and the substituent $R_1$ are directly linked. In addition, when L is a linking group, the linking group is not particularly limited as long as it does not impair the effects of the present disclosure. In an embodiment L may be an alkylene group such as a C1 to C6 alkylene group, for example, a methylene group, an ethylene group, a trimethylene group, a propylene group, an isopropylidene group, a tetramethylene group, a 2-methyltrimethylene group, a 1-methyltrimethylene group, a 1-ethylethylene group, a 1,2-dimethylethylene group, a 1,1-dimethylethylene group, or the like; or a divalent C6 to C30 aromatic hydrocarbon group (e.g., a phenylene group, a biphenylene group, a naphthylene group, a triphenylene group or the like).

From the viewpoints of an improvement of a refractive index and heat resistance, and the like, L may be a single bond, a methylene group, an ethylene group, a phenylene group, a biphenylene group, a naphthalene group, or the like, among the above groups. For example, L may be a single bond, a methylene group, or a phenylene group, for example, L may be a single bond, or a phenylene group, and for example, L may be a single bond.

In General Formula 2, $R_1$ represents a group including at least one atom that is an oxygen atom (O), a sulfur atom (S), a nitrogen atom (N), and a selenium atom (Se). Specific examples of $R_1$ are not particularly limited as long as they do not inhibit the effect of the present disclosure, but may be one of the groups represented by Formulae (4-1) to (4-8):

(4-1)

$$*\text{—S—}C_mH_{2m+1}$$

(4-2-1)

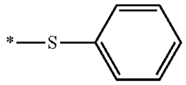

-continued (4-2-2)

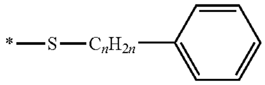

(4-3)

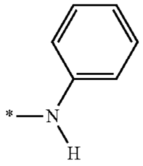

(4-4)

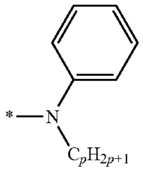

(4-5)

$$*\text{—O—}C_mH_{2m+1}$$

(4-6)

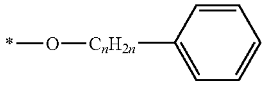

(4-7)

$$*\text{—Se—}C_mH_{2m+1}$$

(4-8)

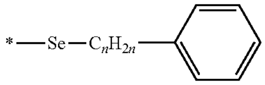

In Formulae (4-1), (4-5), and (4-7), m is independently an integer of 1 to 6. From the viewpoints of an improvement of a refractive index and heat resistance, and the like, m may be, for example, an integer of 1 to 6, for example, an integer of 1 to 3, for example, 1 or 2. In an embodiment, they may be represented by the following groups:

$*\text{—S—}CH_3$ and $*\text{—S—}C_2H_5$.

In Formulae (4-2-2), (4-6), and (4-8), n is independently an integer of 1 to 6. From the viewpoints of an improvement of a refractive index, and heat resistance, and the like, n may be, for example, an integer of 1 to 3, for example, 1 or 2. In an embodiment, $R_1$ may be represented by the following group:

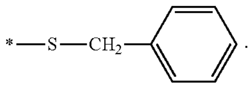

In Formula (4-4), p is an integer from 1 to 6. From the viewpoints of an improvement of a refractive index, and heat resistance, and the like, p may be an integer from 1 to 5, for example 1 to 3, for example 1 or 2, and $R_1$ may be represented by any one of the following groups:

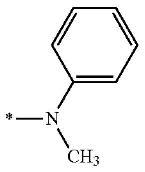

or

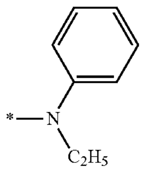

.

Among the groups, from the viewpoints of an improvement of a refractive index and heat resistance, and the like, $R_1$ may be, for example, a group represented by formulas (4-1) to (4-4). In other words, in an embodiment of the present disclosure, $R_1$ may be a group represented by any one of Formulae (4-1) to (4-4). For example, $R_1$ may be a group represented by any one of Formulae (4-1), (4-3), and (4-4), for example, by Formula (4-3) or (4-4), and for example, the group may be represented by Formula (4-3).

Structural Unit B

In an embodiment, the triazine ring-containing polymer according to an embodiment may include the structural unit B represented by any one of General Formulae 3-1 to 3-3:

General Formulae 3-1 to 3-3:

(3-1)

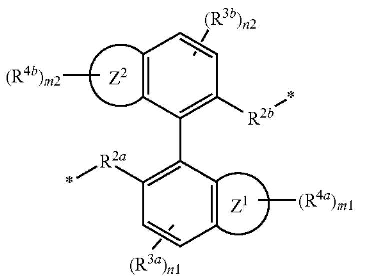

(3-2)

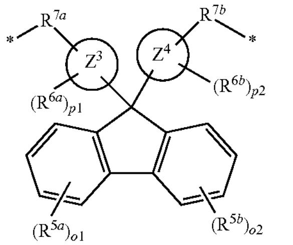

(3-3)

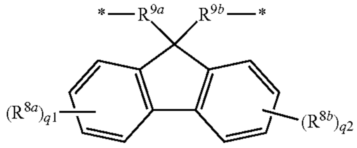

wherein, in General Formula 3-1, $R^{2a}$ and $R^{2b}$ are each independently a C1 to C10 alkylene group, or an alkylene oxide group of formula —(O—$C_mH_{2m})_n$—, wherein, m is an integer ranging from 1 to 4, and n is an integer ranging from 1 to 3, $Z^1$ and $Z^2$ are each independently hydrogen, or a fused aromatic hydrocarbon group, wherein, $R^{3a}$, $R^{3b}$, $R^{4a}$ and $R^{4b}$ are each independently a substituent, n1 and n2 are each independently 0, 1, or 2, m1 and m2 are each independently an integer of 0, or any one of 1 to 4, and

* indicates a point linked to another structural unit or atom;

wherein, in General Formula 3-2, $Z^3$ and $Z^4$ are each independently an aromatic hydrocarbon group, $R^{5a}$, $R^{5b}$, $R^{6a}$ and $R^{6b}$ are each independently a substituent, $R^{7a}$ and $R^{7b}$ are each independently a C1 to C10 alkylene group, or an alkylene oxide group of formula —(O—$C_mH_{2m})_n$—, wherein, m is an integer ranging from 1 to 4, and n is an integer ranging from 1 to 3, o1 and o2 are each independently an integer of 0, or any one of 1 to 4, and p1 and p2 are each independently an integer of 0, or any one of 1 to 4, and

* indicates a point linked to another structural unit or atom;

wherein, in General Formula 3-3, $R^{8a}$ and $R^{8b}$ are each independently a substituent, $R^{9a}$ and $R^{9b}$ are each independently a C1 to C10 alkylene group, or an alkylene oxide group of formula —(O—$C_mH_{2m})_n$—, wherein, m is an integer ranging from 1 to 4, and n is an integer ranging from 1 to 3, q1 and q2 are each independently an integer of 0, or any one of 1 to 4, and

* indicates a point linked to another structural unit or atom.

In an embodiment, General Formula 3-1 may include any one of the following formulae:

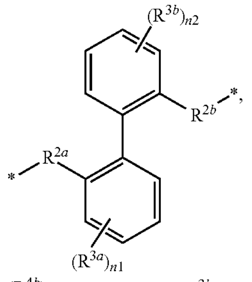

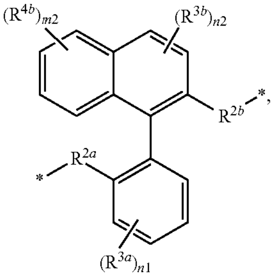

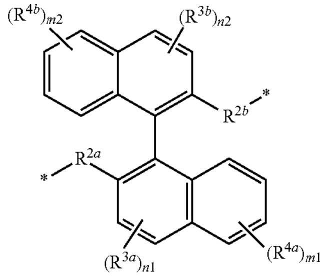

In the above formulae, *, $R^{2a}$, $R^{2b}$, $R^{3a}$, $R^{3b}$, $R^{4a}$, $R^{4b}$, $n_1$, $n_2$, $m_1$, and $m_2$ are the same as those in General Formula 3-1.

In General Formulae 3-1 to 3-3, the C1 to C10 alkylene group may include a liner or branched alkylene group, such as, for example, methylene group (—$CH_2$—), ethylene group (—$CH_2CH_2$—), trimethylene group (—$CH_2CH_2CH_2$—), propylene group (—$CH(CH_3)CH_2$—), 2-ethylhexamethylene group (—$CH_2CH(CH_2CH_3)CH_2CH_2CH_2CH_2$—), and the like. Among those, the alkylene group may include ethylene group or trimethylene group.

In General Formulae 3-1 to 3-3, m of the alkylene oxide group (—(O—$C_mH_{2m})_n$—) is an integer ranging from 1 to 4, for example, may be 2, and n is an integer ranging from 1 to 3, for example may be 1.

Examples of the alkylene oxide group (—(O—$C_mH_{2m})_n$—) may include —O—$CH_2$—, —O—$CH_2CH_2$—, —O—$CH_2CH_2CH_2$—, —O—$CH(CH_3)CH_2$—, —(O—$CH_2)_2$—, —(O—$CH_2CH_2)_2$—, and the like, and are not limited thereto.

In General Formulae 3-1 to 3-3, the aromatic hydrocarbon group may include benzene ring, naphthalene ring, phenanthrene ring, and the like, for example, benzene ring, or naphthalene ring, for example, benzene ring.

In General Formulae 3-1 to 3-3, the substituent may include, for example, a C1 to C30 alkyl group, a C1 to C30 alkoxy group, a C6 to C30 aryloxy group, a C1 to C30 secondary or tertiary amino group, cyano group, a C6 to C30 aromatic hydrocarbon group, an heteroaryl group having a C3 to C30 of ring-forming carbon atoms, and the like. Among these, for example, a C1 to C10 alkyl group, a C6 to C12 aromatic hydrocarbon group, and the like, may be included, and is not limited thereto.

The C1 to C10 alkyl group may include, for example, methyl group, ethyl group, n-propyl group, isopropyl group, n-butyl group, isobutyl group, sec-butyl group, tert-butyl group, n-pentyl group, isopentyl group, tert-pentyl group, neopentyl group, 1,2-dimethylpropyl group, n-hexyl group, isohexyl group, 1,3-dimethylbutyl group, 1-isopropylpropyl group, 1,2-dimethylbutyl group, n-heptyl group, 1,4-dimethylpentyl group, 3-ethylpentyl group, 2-methyl-1-isopropylpropyl group, 1-ethyl-3-methylbutyl group, n-octyl group, 2-ethylhexyl group, 3-methyl-1-isopropylbutyl group, 2-methyl-1-isopropyl group, 1-tert-butyl-2-methylpropyl group, n-nonyl group, 3,5,5-trimethylhexyl group, n-decyl group, isodecyl group, and the like. Among these, for example, methyl group, ethyl group, n-propyl group may be included, and are not limited thereto.

The C6 to C12 aromatic hydrocarbon group may be include, for example, phenyl, biphenyl, fluorenyl group, naphthyl group, and the like. Among these, phenyl group, biphenyl group, or naphthyl group may be included, and is not limited thereto.

In an embodiment, in General Formula 3-1, $Z_1$ and $Z_2$ may each independently be benzene ring, and $R^{3a}$, $R^{3b}$, $R^{4a}$ and $R^{4b}$ may each independently be a C1 to C10 alkyl group, or a C6 to C12 aromatic hydrocarbon group; in General Formula 3-2, Z3 and Z4 may each independently be benzene ring, and $R^{5a}$, $R^{5b}$, $R^{6a}$ and $R^{6b}$ may each independently be a C1 to C10 alkyl group, or a C6 to C12 aromatic hydrocarbon group; in General Formula 3-3, $R^{8a}$ and $R^{8b}$ may each independently be a C1 to C10 alkyl group, or a C6 to C12 aromatic hydrocarbon group.

The inventors have discovered that the triazine ring-containing polymer according to an embodiment may have a significantly low birefringence when an external force, such as, for example, by injection molding, elongation, or the like, is added to the polymer. Without wishing to be bound by a specific theory, this is because, upon the external force being added, the triazine rings of the structural unit A of the triazine ring-containing polymer of the embodiment may arrange in parallel to the backbone of the polymer, while the aromatic hydrocarbon groups, such as, for example, binaphthalene ring, biphenylfluorene ring, fluorene ring, or the like, of the structural unit B may arrange in perpendicular to the backbone of the polymer (see the figure). Without wishing to be bound by a specific theory, it is considered that the effects are exhibited by in addition to introducing a specific aromatic hydrocarbon group, such as, for example, binaphthalene ring, biphenylfluorene ring, fluorene ring, or the like, as a structural unit B, connecting the specific aromatic hydrocarbon group to the triazine ring of the structural unit A via a linker having a certain length, i.e., ranging from one atom to six atoms, such as, for example, Rea and $R^{2b}$ of General Formula 3-1, $R^{7a}$ and $R^{7b}$ of General Formula 3-2, or $R^{9a}$ and $R^{9b}$ of General Formula 3-3.

The triazine ring-containing polymer according to an embodiment may include structural units (hereinafter, also referred to as "other structural units") other than the structural unit represented by General Formula 1. However, in an embodiment, other structural units may not be included. Even if other structural units are included, a molar ratio of the number of other structural units relative to the total number of structural units may be less than or equal to about 10 mole percent (mol %). For example, a content of other structural units may be less than or equal to about 5 mol %, for example less than or equal to about 3 mol %, less than or equal to about 1 mol %, or 0 mol %. When the molar ratio of the other structural units is within the above range, reduction of the refractive index of the polymer and the difficulty in molding processes such as heat press and injection molding may be prevented.

When the triazine ring-containing polymer includes two or more structural units, that is, it is a copolymer, the arrangement form of the structural units is not particularly limited. The arrangement may have a block form (block copolymer), a random form (random copolymer), or an alternate form (alternating copolymer).

The triazine ring-containing polymer according to an embodiment may have terminal SH groups, at least a portion of which may be capped with a hydrocarbon group, such as, for example, an alkyl group, an aromatic hydrocarbon group, or a combination thereof. In an embodiment, at least a portion of the hydrogen atoms of the terminal SH groups may be capped with a hydrocarbon group.

Without wishing to be bound by a specific theory, it is considered that by capping the terminal group with the hydrocarbon group, haze or coloration of the polymer may be reduced.

As used herein, the values measured by the method described in the examples below are used for the refractive index ($n_d$).

The triazine ring-containing polymer according to an embodiment has a glass transition temperature (Tg). The Tg may be, an inflection point observed in a differential calorimeter curve by differential scanning calorimetry. The resin having the glass transition temperature has thermoplasticity and may be processed by injection molding. The glass transition temperature of the triazine ring-containing polymer may be greater than or equal to about 80° C. and less than or equal to about 190° C., for example, greater than or equal to about 90° C. and less than or equal to about 160° C., for example, greater than or equal to about 100° C. and less than or equal to about 160° C., for example, greater than or equal to about 100° C. and less than or equal to about 140° C. The glass transition temperature may be adjusted by controlling the structures of the structural units A and/or structural units B. For example, by introducing a bulky structure and a rigid structure to one or more of $R_1$ groups in General Formula 2, the glass transition temperature may be increased.

On the contrary, the glass transition temperature may be reduced by lengthening the length of the linker, such as, for example, Rea and $R^{2b}$ of General Formula 3-1, $R^{7a}$ and $R^{7b}$ of General Formula 3-2, or $R^{9a}$ and $R^{9b}$ of General Formula 3-3.

As used herein, the Tg values measured by the method described in the examples below are used for the glass transition temperature.

The weight average molecular weight (Mw) of the triazine ring-containing polymer according to an embodiment may be greater than about 5,000 Dalton (Da) and less than or equal to about 1,000,000 Da, for example, greater than or equal to about 5,000 Da and less than or equal to about 900,000 Da, greater than or equal to about 5,000 Da and less than or equal to about 800,000 Da, greater than or equal to about 5,000 Da and less than or equal to about 700,000 Da, greater than or equal to about 5,000 Da and less than or equal to about 600,000 Da, greater than or equal to about 5,000 Da and less than or equal to about 500,000 Da, greater than or equal to about 5,000 Da and less than or equal to about 400,000 Da, greater than or equal to about 5,000 Da and less than or equal to about 300,000 Da, greater than or equal to about 10,000 Da and less than or equal to about 500,000 Da, greater than or equal to about 10,000 Da and less than or equal to about 400,000 Da, greater than or equal to about 10,000 Da and less than or equal to about 300,000 Da, greater than or equal to about 20,000 Da and less than or equal to about 1,000,000 Da, greater than or equal to about 20,000 Da and less than or equal to about 900,000 Da, greater than or equal to about 20,000 Da and less than or equal to about 800,000 Da, greater than or equal to about 20,000 Da and less than or equal to about 700,000 Da, greater than or equal to about 20,000 Da and less than or equal to about 600,000 Da, greater than or equal to about 20,000 Da and less than or equal to about 500,000 Da, greater than or equal to about 20,000 Da and less than or equal to about 400,000 Da, greater than or equal to about 20,000 Da and less than or equal to about 300,000 Da, greater than or equal to about 20,000 Da and less than or equal to about 200,000 Da, greater than or equal to about 20,000 Da and less than or equal to about 150,000 Da, greater than or equal to about 20,000 Da and less than or equal to about 100,000 Da, greater than or equal to about 20,000 Da and less than or equal to about 90,000 Da, greater than or equal to about 20,000 Da and less than or equal to about 80,000 Da, greater than or equal to about 20,000 Da and less than or equal to about 70,000 Da, greater than or equal to about 20,000 Da and less than or equal to about 60,000 Da, or greater than or equal to about 20,000 Da and less than or equal to about 50,000 Da, and is not limited thereto. In an embodiment, the weight average molecular weight (Mw) of the triazine ring-containing polymer may be greater than or equal to about 5,000 Da and less than or equal to about 300,000 Da, for example, greater than or equal to about 20,000 Da and less than or equal to about 200,000 Da.

When the weight average molecular weight is within the above numerical range, the transmittance (transparency) and heat resistance of the article may be improved, and the mechanical strength of the article may also be improved. The method of controlling the weight average molecular weight within the above numerical range is not particularly limited, but a method of controlling the polymerization reaction time may be used. As used herein, the value measured by the method described in the examples below is used for the weight average molecular weight values.

A method for preparing the triazine ring-containing polymer according to an embodiment is not particularly limited. For example, as shown in Reaction Scheme 1, the triazine ring-containing polymer according to an embodiment may be prepared by first reacting a triazine dithiol compound with an aromatic compound having a leaving group, i.e., the compound having a leaving group in Reaction Scheme 1, which is derived from a compound represented by General Formula 3-1, of which n1, n2, m1, and m2 are all 0, in the presence of a phase transfer catalyst to provide a polymer. Subsequently, if necessary, the polymer and a capping agent are reacted in the presence of a phase transfer catalyst to provide a triazine ring-containing polymer according to an embodiment.

Reaction Scheme 1

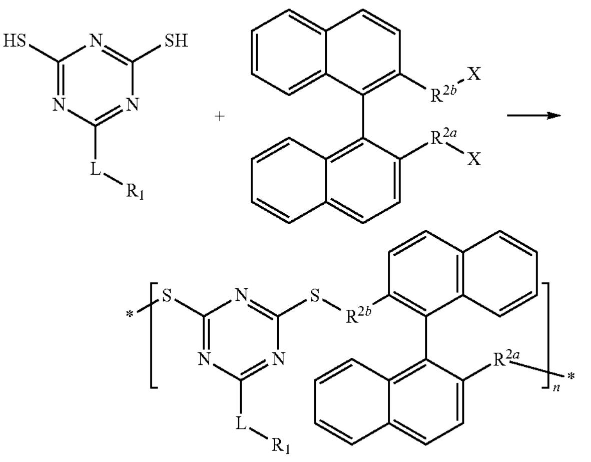

In Reaction Scheme 1, $R_1$ is the same as defined in General Formula 2, *, $R_{2a}$ and $R_{2b}$ are the same as defined in General Formula 3-1, and X indicates a leaving group.

Examples of X include fluoro atom, chloro atom, bromine atom, iodine atom, tosyl(p-toluensulfonyl) group, triflyl (trifluoromethylsulfonyl) group, methanesulfonyl group, chloromethylsulfonyl group, nitro group, or the like, and is not limited thereto.

The triazine dithiol compound is not particularly limited and may be appropriately selected from, for example, 2-methylthio-1,3,5-triazine-4,6-dithiol, 2-ethylthio-1,3,5-triazine-4,6-dithiol, 2-benzylthio-1,3,5-triazine-4,6-dithiol, 2-(2'-phenylethylthio)-1,3,5-triazine-4,6-dithiol, 2-methoxy-1,3,5-triazine-4,6-dithiol, 2-ethoxy-1,3,5-triazine-4,6-dithiol, 2-benzyloxy-1,3,5-triazine-4,6-dithiol, 2-anilino-1,3,5-triazine-4,6-dithiol, 2-(N-methylanilino)-1,3,5-triazine-4,6-dithiol, or the like, but is not limited thereto. The triazine dithiol compounds may be used alone or in a combination of two or more.

The aromatic compound having a leaving group may be appropriately selected from, for example, 9,9-bis(6-(2-chloroethoxy)-(1,1'-biphenyl)-3-yl) fluorene, 9,9-bis(6-(2-bromoethoxy)-(1,1'-biphenyl)-3-yl) fluorene, 2,2'-bis(2-chloroethoxy)-1,1'-binaphtyl, 2,2'-bis(2-bromoethoxy)-1,1'-binaphtyl, 9,9-bis(4'-(2"-chloroethoxy)phenyl) fluorene, 9,9-bis(4'-(2"-bromoethoxy)phenyl) fluorene, 9,9-bis(4'-(3'-chloropropyl) fluorene, 9,9-bis(4'-(3'-bromopropyl) fluorene, or the like, but is not limited thereto. The aromatic compound having a leaving group may be used alone or in a combination of two or more.

As a capping agent, a compound having a leaving group, such as, for example, a halogen, is linked to the hydrocarbon group. In this case, examples of the leaving group may be, as same as X, a fluorine atom, a chlorine atom, a bromine atom, an iodine atom, a tosyl group (p-toluenesulfonyl group), a triflyl group (trifluoromethylsulfonyl group), and a nitro group, but are not limited thereto. Specific examples of the capping agent include benzyl chloride, benzyl bromide, 2-bromoethylbenzene, bromomethane, methane iodide, α-chloro-p-xylene, α-chloro-o-xylene, 1-(chloromethyl) naphthalene, and the like, and are not limited thereto. The capping agent may be used alone or in a combination of two or more.

As a phase transfer catalyst used in the reaction between a triazinedithiol compound and an aromatic compound having a leaving group, and/or between a polymer and a capping agent, a long-chain alkyl quaternary ammonium salt, a crown ether, and the like may be used, which are known for use in the interfacial polycondensation reaction. Specific examples of the phase transfer catalyst may include, for example, tetrabutyl ammonium bromide (TBAB), hexadecyl trimethylammonium bromide (CTAB), and the like.

The reaction system may be a two-phase system of water and an organic solvent, for example, an organic solvent such as chloroform, dichloromethane, cyclhexanone, benzonitrile, and nitrobenzene, and water may be used as the two-phase system. During the reaction, bases such as sodium hydroxide and potassium hydroxide may be added to react them at greater than or equal to about −10° C. and less than or equal to about 100° C. for greater than or equal to about 1 hour and less than or equal to about 120 hours.

The triazine ring-containing polymer obtained through the above methods may be purified by a general purification method such as a reprecipitation method, a dialysis method, an ultrafiltration method, and an extraction method. Further, the obtained triazine ring-containing polymer may be dried, for example, under vacuum, at room temperature to about 120° C., in order to completely remove the remaining solvent included in the polymer. As such, the completely dried polymer may be used to evaluate refractive index, birefringence, glass transition temperature, and the like.

Thermoplastic Resin, Article, and Optical Parts

An embodiment provides a thermoplastic resin including the triazine ring-containing polymer.

An embodiment provides a thermoplastic molded article including the triazine ring-containing polymer.

An embodiment provides an optical part comprising the triazine ring-containing polymer.

A shape of the article is not particularly limited but any suitable type, for example, lens-type (spherical lens, non-spherical lens, Fresnel lens, and the like), film-type, sheet-type, plate-type, bar-type, fiber-type, prism-type, and the like. The article may be manufactured, for example, in a well-known method such as an injection molding method, a compression molding method, an extrusion method, a transfer method, a blow method, a pressure method, an elongation method, a coating method (a spin coating method, a roll coating method, a curtain coating method, a dip coating method, a casting method, and the like) and the like. Among them, the polymer according to the embodiment may be used in an injection molding.

As described above, it is possible to avoid a great birefringence by an external force added by injection molding. Without wishing to be bound by a specific theory, it is considered that the triazine rings in the structural unit A arrange in parallel to the backbone of the polymer, while the aromatic hydrocarbon groups, such as, for example, binaphthalene ring, biphenylfluorneyl ring, fluorenyl ring, or the like, in the structural unit B arrange in perpendicular to the backbone of the polymer. In this regard, the external force may be, for example, before injection molding, greater than or equal to about 1001/s as a shear rate.

In an embodiment, as long as the ternal force is added, the manufacturing method is not limited to injection molding, other methods, such as an elongation method, a compression molding method, an extrusion method, a transfer method, a blow method, a pressure method, an elongation method, a coating method (a spin coating method, a roll coating method, a curtain coating method, a dip coating method, a casting method, and the like), or the like may be used.

Before forming the article, a kneading apparatus such as a Henschel mixer, a kneader, a banbury mixer, an extruder, and the like may be used to mix raw materials. When the injection molding is adopted, a cylinder temperature may be, for example, greater than or equal to about 150° C. and less than or equal to about 300° C. and a molding temperature of greater than or equal to about 50° C. and less than or equal to about 100° C.

The optical part may be appropriately used as an optical part transmitting light (a passive optical part) in a display (for example, a display for a smart phone, a liquid crystal display, a plasma display, and the like), an imaging system (for example, a camera, a video, and the like), an optical pickup, a projector, an optical fiber communication equipment (for example, an optical amplifier and the like), a head lamp for a vehicle, and the like. These optical parts may include, for example, lens, a film, an optical waveguide, a prism, a prism sheet, a panel, an optical disk, a sealant of LED, and the like. These optical parts may have, if necessary, various functional layers such as an anti-reflection layer, a light absorption layer, a hard coating layer, an antiglare layer, and the like.

EXAMPLES

Hereinafter, exemplary aspects of the present disclosure will be described in detail with reference to examples, but the present disclosure is not limited to the aspects of the following examples.

In the following examples, "parts" indicates "parts by weight" unless it is particularly specified otherwise.

Measurement Methods of Properties

Number Average Molecular Weight ($M_n$) and Weight Average Molecular Weight ($M_w$)

The number average molecular weight ($M_n$) and the weight average molecular weight ($M_w$) of the polymer were measured by the following method.

A measurement sample was prepared by dissolving a polymer in N-methyl-2-pyrrolidone (NMP) to a concentration of 0.1 weight percent (wt %) and filtering the solution with a polytetrafluoroethylene membrane filter having a bore diameter of 0.2 micrometers (μm). A number average molecular weight and a weight average molecular weight of the sample were measured through gel permeation chromatography (GPC) using tetrahydrofuran (THF) as a mobile phase with a differential refractometer as a detector. Monodisperse polystyrene was used as a standard material of a molecular weight.

Example 1: Synthesis of Triazine Ring-Containing Polymer (4)

Reaction Scheme 2

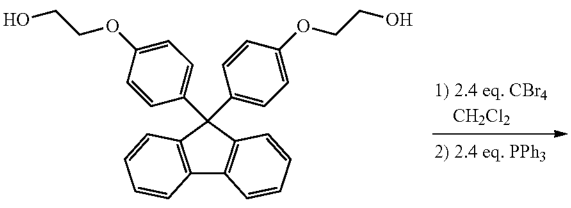

(1)

-continued

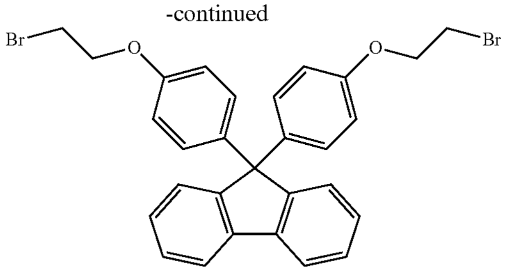

(2)

9,9-bis(4'-(2"-hydroxyethoxy)phenyl) fluorene (1) (8.8 grams (g), 20 millimoles (mmol)) was added to and dissolved in dichloromethane (100 milliliters (ml)) in a 200 ml flask having a branch under nitrogen (N2) atmosphere. After cooling the solution to 0 degree Celsius (° C.), carbon tetrabromide (15.9 g, 48 mmol) was added, and then triphenylphosphine (12.6 g, 48 mmol) was divided in small portions and added in small portions thereto. After 2 hours stirring, the solvent was removed by decompression distillation. The residue was purified by a silica gel column chromatography (developing solvent, hexane/ethyl acetate=5/1), and 9,9-bis(4'-(2"-bromo ethoxy)phenyl) fluorene (2) (10.5 g) was obtained as a colorless crystal.

Reaction Scheme 3

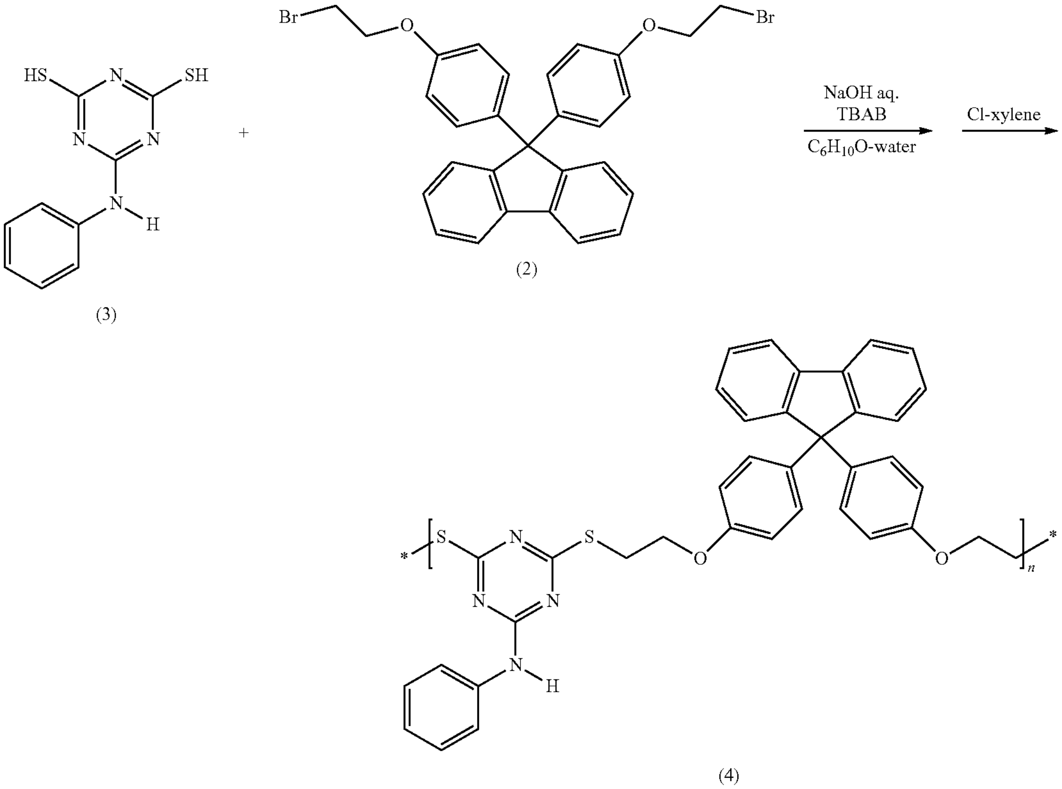

(3) (2) (4)

2-anilino-1,3,5-triazine-4,6-dithiol (3) (1.0 g, 4.2 mmol) was added to 30 ml flask, and water (3.5 ml) and sodium hydroxide (0.34 g, 8.6 mmol) were added thereto to be stirred. Tetrabutyl ammonium bromide (TBAB) (0.1 g) was added thereto, and the mixture was heated to 50° C. and stirred. After 12 hours, α-chloro-p-xylene (0.1 ml) was added, and the resulting mixture was further stirred for 4 hours. After cooling to room temperature, the mixture was washed with water three times, and the organic layer was added to isopropanol (100 ml). White solid was precipitated and obtained as a triazine ring-containing polymer (4) (2.3 g). The obtained polymer has a number average molecular weight ($M_n$) of 6,100 Daltons (Da), and a weight average molecular weight ($M_w$) of 51,800 Da.

Example 2: Synthesis of Triazine Ring-Containing Polymer (7)

Reaction Scheme 4

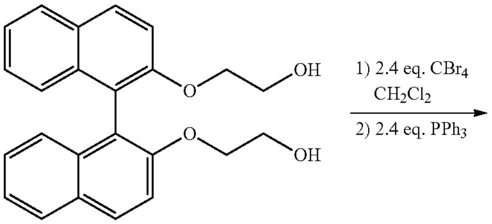

(5)

-continued

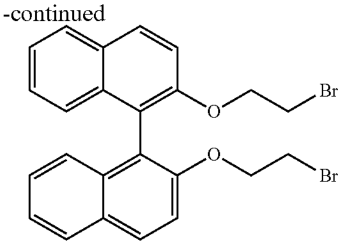

(6)

9,9-bis(4'-(2-hydroxyethoxy)-1,1'-binaphtyl (5) (3.7 g, 10 mmol) was added to and dissolved in dichloromethane (50 ml) in a 200 ml flask having a branch under nitrogen (N2) atmosphere. After cooling the solution to 0° C., carbon tetrabromide (8.0 g, 24 mmol) was added, and then triphenylphosphine (6.3 g, 24 mmol) was divided in small portions and added in small portions thereto. After heating to room temperature, the mixture was stirred for 12 hours, and the solvent was removed by decompression distillation. The residue was purified by a silica gel column chromatography (developing solvent, hexane/ethyl acetate=1/1), and 2,2'-bis(2-bromo ethoxy)-1,1'-binaphtyl (6) (4.0 g) was obtained as white needle crystal.

Reaction Scheme 5

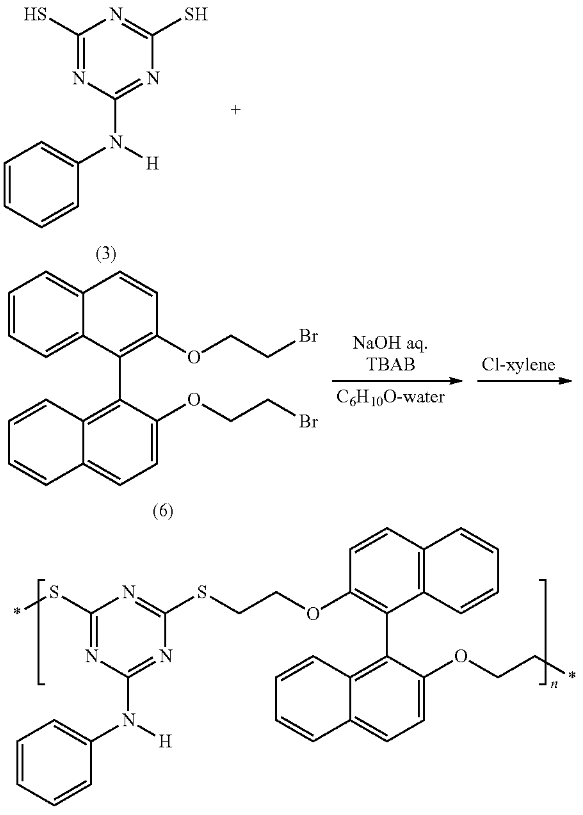

(7)

2-anilino-1,3,5-triazine-4,6-dithiol (3) (0.4 g, 1.6 mmol) was added to 30 ml flask, and water (1.5 ml) and sodium hydroxide (0.13 g, 3.3 mmol) were added thereto to be stirred. 2,2'-Bis(2-bromo ethoxy)-1,1'-binaphtyl (6) (0.8 g, 1.6 mmol) and cyclohexanone (3 ml) were added to the solution. To this solution, tetrabutyl ammonium bromide (TBAB) (0.1 g) was added, heated to 70° C., and stirred. After 12 hours, α-chloro-p-xylene (0.1 ml) was added, and the resulting mixture was further stirred for 4 hours. After cooling to room temperature, the mixture was washed with water three times, and the organic layer was added to isopropanol (50 ml). White solid was precipitated and obtained as a triazine ring-containing polymer (7) (0.7 g). The obtained polymer has a number average molecular weight of 8,500 Daltons (Da), and a weight average molecular weight of 67,000 Da.

Example 3: Synthesis of Triazine Ring-Containing Polymer (10)

Reaction Scheme 6

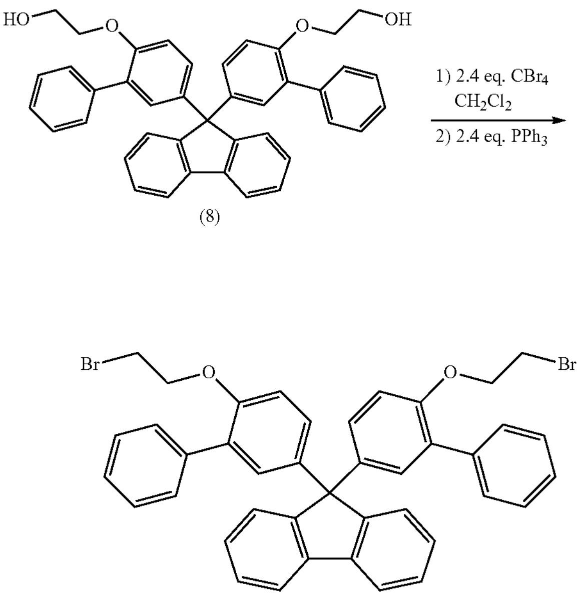

(9)

9,9-bis(6-(2-hydroxyethoxy)-(1,1'-binaphtyl)-3-yl) fluorene (8) (10 g, 17 mmol) was added to and dissolved in dichloromethane (60 ml) in a 200 ml flask having a branch under nitrogen (N2) atmosphere. After cooling the solution to 0° C., carbon tetrabromide (13 g, 40 mmol) was added, and then triphenylphosphine (10 g, 40 mmol) was divided in small portions and added in small portions thereto. After heating to room temperature, the mixture was stirred for 12 hours, and the solvent was removed by decompression distillation. The residue was purified by a silica gel column chromatography (developing solvent, hexane/ethyl acetate=1/1), and 9,9-bis(6-bromo ethoxy)-(1,1'-binaphtyl)-3-yl) fluorene (9) (7.3 g) was obtained as white powder.

Reaction Scheme 7

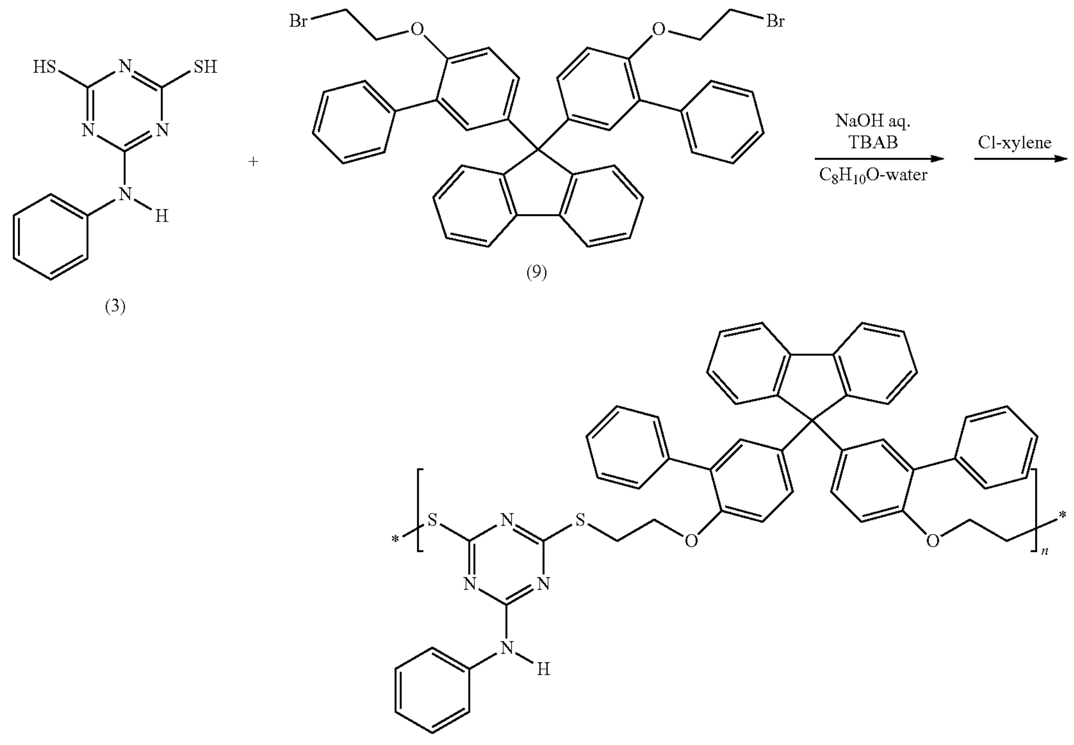

(10)

2-anilino-1,3,5-triazine-4,6-dithiol (3) (1.0 g, 4.2 mmol) was added to 30 ml flask, and water (3.5 ml) and sodium hydroxide (0.34 g, 8.6 mmol) were added thereto to be stirred. 9,9-bis(6-bromo ethoxy)-(1,1'-binaphtyl)-3-yl) fluorene (9) (2.9 g, 4.2 mmol) and cyclohexanone (10 ml) were added to the solution. To this solution, tetrabutyl ammonium bromide (TBAB) (0.1 g) was added, heated to 70° C., and stirred. After 12 hours, α-chloro-p-xylene (0.1 ml) was added, and the resulting mixture was further stirred for 4 hours. After cooling to room temperature, the mixture was washed with water three times, and the organic layer was added to isopropanol (100 ml). White solid was precipitated and obtained as a triazine ring-containing polymer (10) (3.1 g). The obtained polymer has a number average molecular weight of 13,700 Daltons (Da), and a weight average molecular weight of 154,000 Da.

Example 4: Synthesis of Triazine Ring-Containing Polymer (13)

Reaction Scheme 8

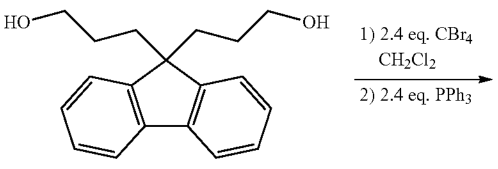

(11)

-continued

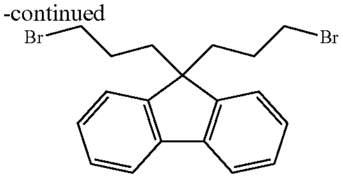

(12)

The same method as in Example 3 was performed to obtain 9,9-bis(3'-bromo propyl) fluorene (12) as colorless crystal, except that 9,9-bis(3'-hydroxy propyl) fluorene (11) was used as a raw material instead of 9,9-bis(4'-(2"-hydroxy ethoxy)phenyl) fluorene (8). The yield was 80%.

Reaction Scheme 9

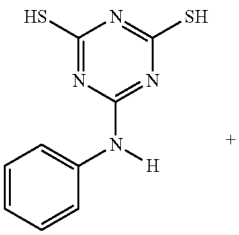

(3)

-continued

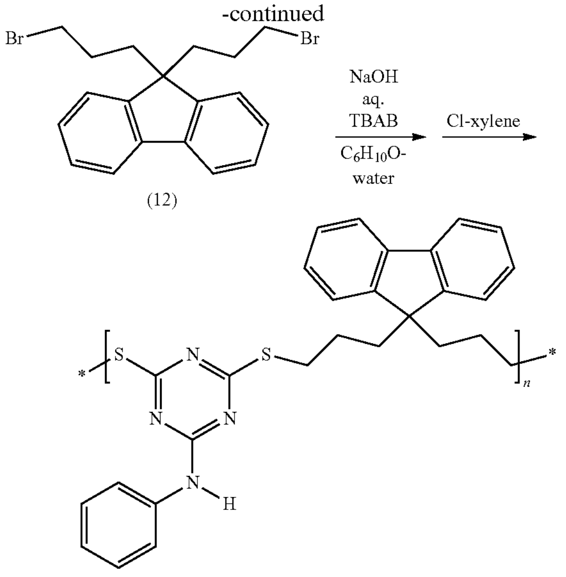

(12)

(13)

The same method as in Example 3 was performed to obtain a triazine ring-containing polymer (13), except that 9,9-bis(3'-bromo propyl) fluorene (12) was used instead of 9,9-bis(4'-(2"-bromo ethoxy)phenyl) fluorene (9). The obtained polymer has a number average molecular weight of 15,300 Daltons (Da), and a weight average molecular weight of 120,800 Da.

Example 5: Synthesis of Triazine Ring-Containing Polymer (18)

Reaction Scheme 10

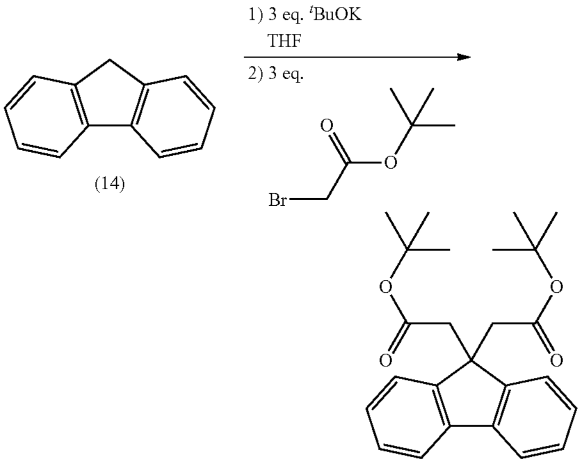

(14)

(15)

Potassium tert-butoxide (3.4 g, 30 mmol) was added to and dispersed in tetrahydrofuran (THF) (10 ml) in a 100 ml flask having a branch under nitrogen (N2) atmosphere, and cooled to 0° C. Fluorene (14) (1.7 g, 10 mmol) was dissolved in THF (10 ml), and the mixture was added dropwise to the 100 ml flask. After 30 minutes stirring, bromo acetic acid ter-butyl ester (5.9 g, 30 mmol) was added dropwise thereto, and stirred for 3 hours. After adding water and ethyl acetate, the organic layer was isolated, and solvent was removed by decompression distillation to obtain fluorene-9,9-diacetic acid di-tert-butyl ester (15) (3.5 g).

Reaction Scheme 11

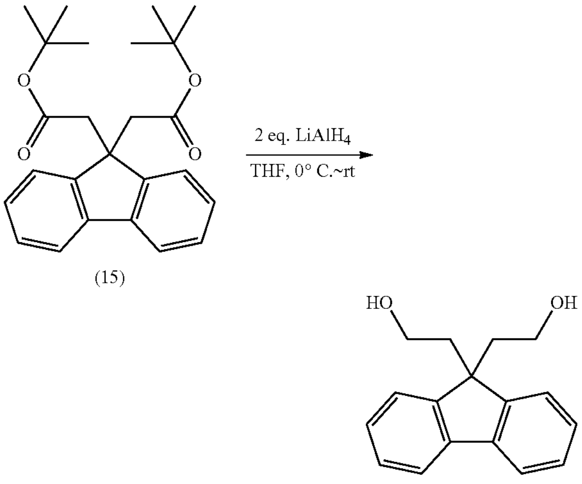

(15)

(16)

Lithium aluminum hydride (LAH) (0.8 g, 20 mmol) was added to and dispersed in tetrahydrofuran (THF) (35 ml) in a 100 ml two neck flask under nitrogen (N2) atmosphere, and cooled to 0° C. Fluorene-9,9-diacetic acid di-tert-butyl ester (15) (3.9 g, 10 mmol) was dissolved in THF (6 ml), and the mixture was added dropwise to the 100 ml two neck flask. After 2 hours stirring at room temperature, saturated Roselle salt aqueous solution (20 ml) was added dropwise thereto. After isolating the organic layer, the solvent was removed by distillation. After adding dichloromethane thereto, solid was isolated to obtain fluorene-9,9-diethanol (16) (1.0 g). The yield was 40%.

Reaction Scheme 12

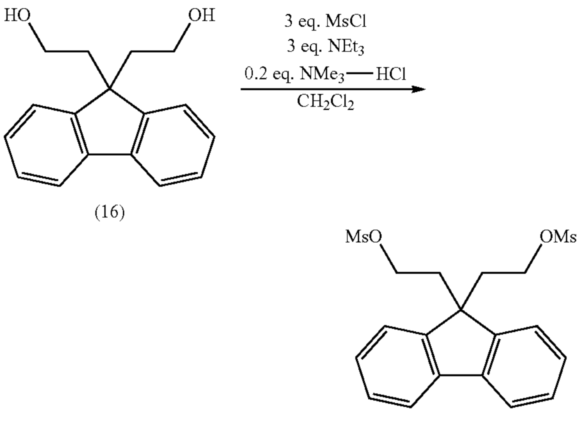

(16)

(17)

Fluorene-9,9-diethanol (16) (1.0 g, 3.9 mmol), triethyl amine (1.2 g, 12 mmol), and trimethyl amine hydrochloric acid salt (76 mg, 0.8 mmol) were added to and dissolved in dichloromethane (15 ml) in a 100 ml two neck flask under nitrogen (N2) atmosphere. The solution was cooled to 0° C., and dichloro methane solution (1 ml) containing mesyl chloride (1.4 g, 12 mmol) was dropwise added thereto. After 30 minutes, aqueous solution of saturated sodium hydrogen carbonate was added to the solution, and the organic layer was isolated. Then, the solvent was removed by distillation. After adding methanol to the residue, 9,9-bis(2'-mesyloxyethyl) fluorene (17) (1.5 g) was obtain as solid. The yield was 92%.

Reaction Scheme 13

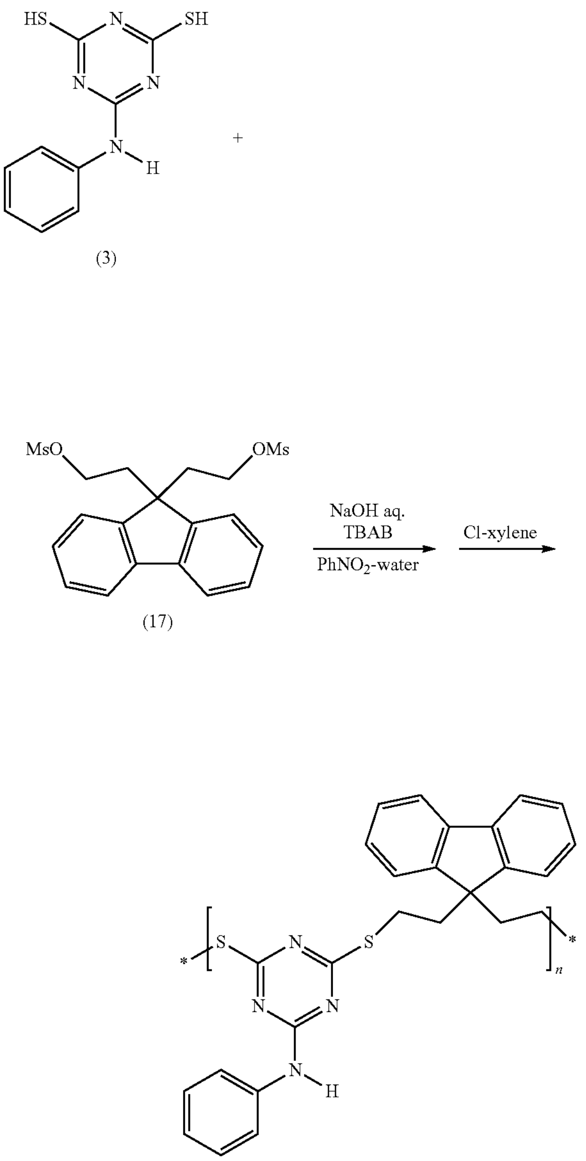

(3)

(17)

(18)

The same method as in Example 4 was performed to obtain a triazine ring-containing polymer (18), except that 9,9-bis(2'-mesyloxyethyl) fluorene (17) was used instead of 9,9-bis(3'-bromo propyl) fluorene (12), and nitrobenzene was used as a reaction solvent instead of cyclohexanone. The obtained polymer has a number average molecular weight of 7,700 Daltons (Da), and a weight average molecular weight of 21,200 Da.

Comparative Example 1: Synthesis of Triazine Ring-Containing Polymer (20)

Reaction Scheme 14

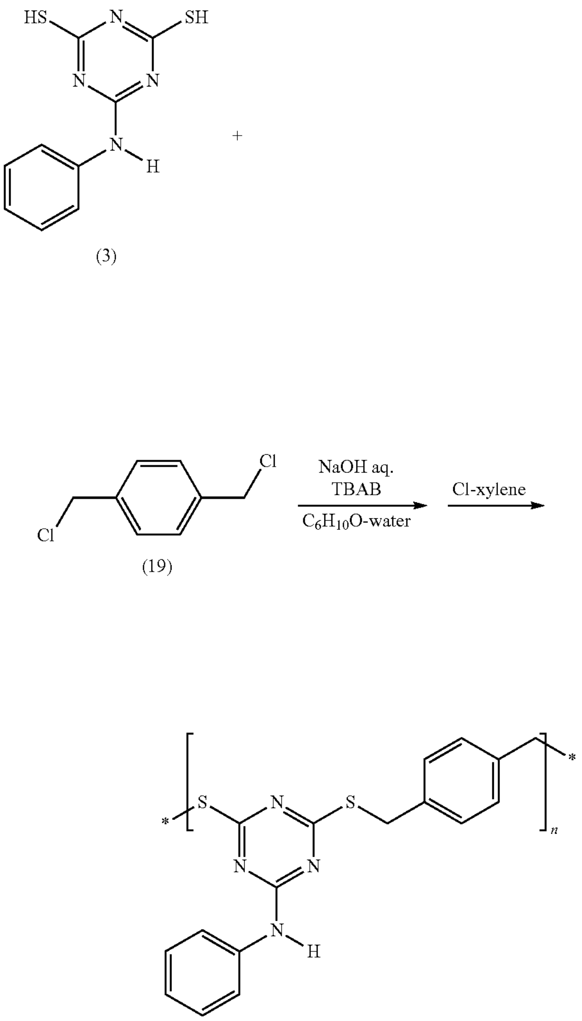

(3)

(19)

(20)

2-anilino-1,3,5-triazine-4,6-dithiol (3) (2.0 g, 8.5 mmol) was added to 30 ml flask, water (6.0 ml) and sodium hydroxide (0.70 g, 17.4 mmol) were added and the resulting solution was stirred. To this solution, a, a'-dichloro-p-xylene (19) (1.42 g, 8.2 mmol) and cyclohexanone (10 ml) were added. To this solution, tetrabutyl ammonium bromide (TBAB) (0.14 g) was added, and the mixture was heated to 50° C. and stirred. After 12 hours, α-chloro-p-xylene (0.23 ml) was added, and the resulting mixture was further stirred for 4 hours. After cooling to room temperature, the mixture was washed with water three times, and the organic layer was added to isopropanol (100 ml). White solid was precipitated and obtained as a triazine ring-containing polymer (20) (2.1 g). The obtained polymer has a number average molecular weight of 19,000 Daltons (Da), and a weight average molecular weight of 175,000 Da.

Comparative Example 2: Synthesis of Triazine Ring-Containing Polymer (22)

Reaction Scheme 15

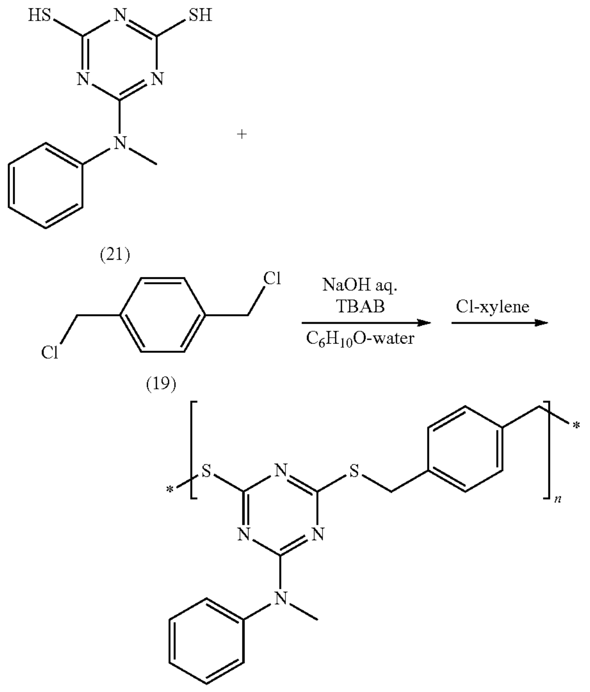

(21)

(19)

(22)

2-(N-methyl anilino)-1,3,5-triazine-4,6-dithiol (21) (2.0 g, 8.0 mmol) was added to 30 ml flask, and water (6.0 ml) and sodium hydroxide (0.66 g, 16.4 mmol) were added and the resulting solution was stirred. To this solution, a, a'-dichloro-p-xylene (19) (1.34 g, 7.7 mmol) and cyclohexanone (10 ml) were added. To this solution, tetrabutyl ammonium bromide (TBAB) (0.13 g) was added, and the mixture was heated to 50° C. and stirred. After 12 hours, α-chloro-p-xylene (0.22 ml) was added, and the resulting mixture was further stirred for 4 hours. After cooling to room temperature, the mixture was washed with water three times, and the organic layer was added to isopropanol (100 ml). White solid was precipitated and obtained as a triazine ring-containing polymer (22) (2.0 g). The obtained polymer has a number average molecular weight of 6,400 Daltons (Da), and a weight average molecular weight of 79,200 Da.

Comparative Example 3: Synthesis of Triazine Ring-Containing Polymer (25)

Reaction Scheme 16

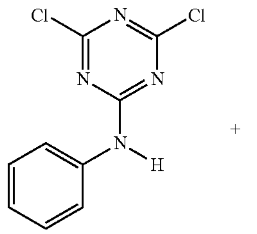

(23)

-continued

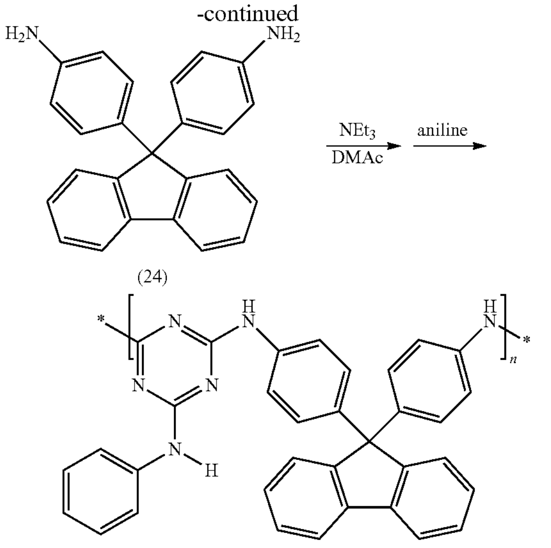

(24)

(25)

2-phenyl amino-4,6-dichloro triazine (23) (1.0 g, 4.1 mmol) and 9,9-bis(4-aminophenyl) fluorene (24) (1.45 g, 4.1 mmol) were added to and dissolved in N,N-dimethyl acetamide (DMAc) (8 ml) in 30 ml flask. To this solution, triethylamine (1.7 ml, 12.4 mmol) was added, heated to 100° C., and stirred for 2 days. Aniline (1.1 ml) was added to quench the reaction, the resulting mixture was stirred for 2 hours. After cooling to room temperature, the mixture was added dropwise to 100 ml of water containing 2.3 g of potassium carbonate. Tetrahydrofuran (THF) solution was added dropwise to hexane-ethanol mixture (150 ml, hexane/ethanol=4/1) to reprecipitate, and reprecipitated pale pink solid was obtained as a triazine ring-containing polymer (25) (1.6 g). The obtained polymer has a number average molecular weight of 6,700 Daltons (Da), and a weight average molecular weight of 24,400 Da.

Evaluation

Refractive Index $n_d$ 2 grams (g) of the obtained polymer was compression-molded under conditions of 200° C. and 10 megapascal (MPa) for 5 minutes, and a molded plate having a length of 3 centimeters (cm), a width of 3 cm, and a thickness of 0.5 millimeters (mm) was manufactured. A refractive index of the molded plate was measured by using Abbe Refractometer (DR-M4, ATAGO Co. Ltd.), and the value measured at d-ray (587.6 nm) was regarded as a refractive index ($n_d$).

Birefringence

A birefringence was measured by using the method described in Nos. 3201594 to 3201597 of Vol. 27, of "Forming Work".

Specifically, a rectangular molded plate having a length of 5 centimeters (cm), a width of 1 cm, and a thickness of 0.6 millimeters (mm) was manufactured by using a heat press machine IMC-16DE, manufacture by Imoto Seisakusho, and 5 points were marked at 5 mm from the center. The plate was elongated three times at a 10° C. higher than the glass transition temperature by using one-axis stretching machine, IMC-18AF, manufacture by Imoto Seisakusho Co. Ltd. A retardation of the elongated plate was measured by using a retardation measuring machine, PETS-100, produced by Otska Electronic Co. Ltd., with respect to the previously marked 5 points in the plate. Birefringence was calculated by dividing the retardation by thickness, i.e., retardation/thickness.

Glass Transition Temperature ($T_g$)

Using a differential scanning calorimeter (DSC), DSC6200, manufacture by SII Co. Ltd., the sample was heated to 300° C. at a heating rate of 10° C. per minute and maintained for 10 minutes, and then, was cooled to 25° C. at a cooling rate of 10° C. per minute and maintained for 10 minutes. Subsequently, the sample was heated to 300° C. at a heating rate of 10° C. per minute, and then, a glass transition temperature ($T_g$) was measured. After measuring the $T_g$, the sample was cooled to room temperature (25° C.) at a cooling rate of 10° C. per minute. Meanwhile, if the $T_g$ is greater than or equal to 180° C., it is possible to subject the polymer to injection molding.

The results are shown in Table 1 below.

TABLE 1

| | Refractive Index ($n_d$) | Birefringence ($\times10^{-4}$) | $T_g$ (° C.) |
|---|---|---|---|
| Example 1 | 1.695 | 52 | 150 |
| Example 2 | 1.720 | 34 | 136 |
| Example 3 | 1.703 | 14 | 160 |
| Example 4 | 1.691 | 34 | 120 |
| Example 5 | 1.703 | 6 | 140 |
| Comparative Example 1 | 1.726 | 380 | 130 |
| Comparative Example 2 | 1.699 | 441 | 112 |
| Comparative Example 3 | 1.709 | unmeasurable ※ | 278 |

※ It was not possible to form a plate by compression molding, and thus, could not be measured.

As shown in Table 1, the triazine ring-containing polymers according to an embodiment have high refractive indices equivalent to those of comparative examples, and significantly lower birefringence than that of the comparative examples. The effects show that by specifying a structural unit B, a triazin ring-containing polymer according to an embodiment has a glass transition temperature ($T_g$) of less than or equal to 180° C., and improved thermoplasticity.

After then, flowability of the polymer was evaluated.

Measurement of Multiflowrate (MFR)

Multiflowrate (MFR) was evaluated based on JIS K7210.

A resin was filled in a cylinder of a multiindexer C-5059D2 (Toyoseiki Co. Ltd.), and the MFR (gram/10 minutes) was measured at 280° C., under a load of 2.16 kilograms (kg).

The results are shown in Table 2.

TABLE 2

| | MFR (gram/10 minutes) |
|---|---|
| Example 1 | 34 |
| Example 4 | 17 |
| Comparative Example 1 | 8 |
| Comparative Example 3 | unmeasurable ※1 |

※1 The polymer did not melt at 280° C., and it was not possible to measure MFR.

As shown in Table 2, the triazine ring-containing polymer according to an embodiment, which has a $T_g$ of less than or equal to 180° C., has improved MFR, and thus, is capable of being injection molded.

While this disclosure has been described in connection with what is presently considered to be practical example embodiments, it is to be understood that the disclosure is not limited to the disclosed exemplary embodiments, but, on the contrary, is intended to cover various modifications and equivalent arrangements included within the spirit and scope of the appended claims.

What is claimed is:

1. A triazine ring-containing polymer comprising a repeating unit represented by General Formula 1:

*-[A-B-]-* General Formula 1 wherein, in General Formula 1,

A is represented by General Formula 2,

B is represented by any one of General Formulae 3-1 to 3-3, and

* indicates a point linked to another structural unit or atom;

General Formula 2

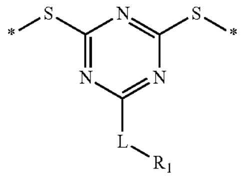

wherein, in General Formula 2,

L is a single bond or a linking group, $R_1$ is a group comprising an oxygen atom, sulfur atom, nitrogen atom, selenium atom, or a combination thereof, and

* indicates a point linked to another structural unit or atom;

General Formulae 3-1 to 3-3

(3-1)

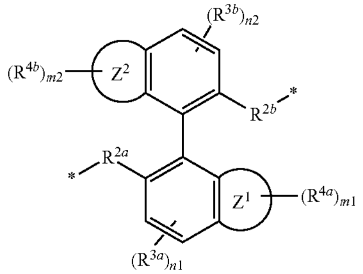

(3-2)

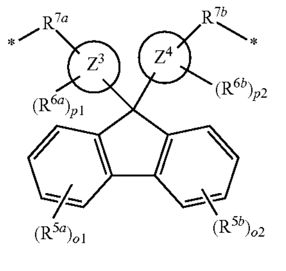

(3-3)

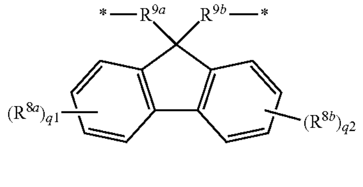

wherein, in General Formula 3-1, $R^{2a}$ and $R^{2b}$ are each independently a C1 to C10 alkylene group, or an alkylene oxide group of formula —(O—$C_mH_{2m}$)$_n$—, wherein, m is an integer ranging from 1 to 4, and n is an integer ranging from 1 to 3;

$Z^1$ and $Z^2$ are independently hydrogen, or a fused aromatic hydrocarbon group, wherein at least one of $Z^1$ or $Z^2$ is the fused aromatic hydrocarbon group, wherein, $R^{3a}$, $R^{3b}$, $R^{4a}$ and $R^{4b}$ are each independently a substituent, n1 and n2 are each independently 0, 1, or 2, m1 and m2 are each independently an integer of 0, or any one of 1 to 4 and

* indicates a point linked to another structural unit or atom;

wherein, in General Formula 3-2, $Z^3$ and $Z^4$ are each independently an aromatic hydrocarbon group, $R^{5a}$, $R^{5b}$, $R^{6a}$ and $R^{6b}$ are each independently a substituent, $R^{7a}$ and $R^{7b}$ are each independently a C1 to C10 alkylene group, or an alkylene oxide group of formula —(O—$C_mH_{2m}$)$_n$—, wherein, m is an integer ranging from 1 to 4, and n is an integer ranging from 1 to 3;

o1 and o2 are each independently an integer of 0, or any one of 1 to 4, and p1 and p2 are each independently an integer of 0, or any one of 1 to 4, and

* indicates a point linked to another structural unit or atom; and wherein, in General Formula 3-3, $R^{8a}$ and $R^{8b}$ are each independently a substituent, $R^{9a}$ and $R^{9b}$ are each independently a C1 to C10 alkylene group, or an alkylene oxide group of formula —(O—$C_mH_{2m}$)$_n$—, wherein, m is an integer ranging from 1 to 4, and n is an integer ranging from 1 to 3, q1 and q2 are each independently an integer of 0, or any one of 1 to 4; and

* indicates a point linked to another structural unit or atom.

2. The triazine ring-containing polymer of claim 1, wherein when L of General Formula 2 is a linking group, and the linking group is a C1 to C6 alkylene group, a divalent C6 to C30 aromatic hydrocarbon group, or an aromatic hydrocarbon linking group in which two or more C6 to C30 aromatic hydrocarbon groups are linked to each other by a single bond, a C1 to C6 alkylene group, or an atom of oxygen, sulfur, or selenium.

3. The triazine ring-containing polymer of claim 1, wherein L of General Formula 2 is a single bond, a methylene group, an ethylene group, a phenylene group, a biphenylene group, or a naphthalene group.

4. The triazine ring-containing polymer of claim 1, wherein L of General Formula 2 is a single bond.

5. The triazine ring-containing polymer of claim 1, wherein $R_1$ of General Formula 2 is represented by any one of Formulae (4-1) to (4-8):

(4-1)

*—S—$C_mH_{2m+1}$ (4-2-1)

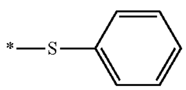

(4-2-2)

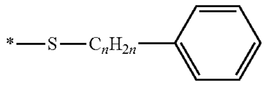

-continued (4-3)

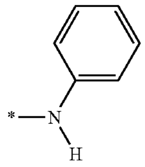

(4-4)

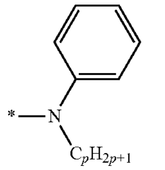

(4-5)

*—O—$C_mH_{2m+1}$ (4-6)

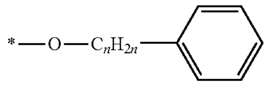

(4-7)

*—Se—$C_mH_{2m+1}$ (4-8)

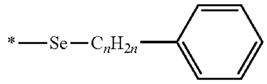

wherein, in Formula (4-1), (4-5), and (4-7), m is independently an integer of 1 to 6, in Formula (4-2-2), (4-6), and (4-8), n is independently an integer of 1 to 6, in Formula (4-4), p is independently an integer of 1 to 6, and

* indicates a point linked to another group or structural unit.

6. The triazine ring-containing polymer of claim 1, wherein $R_1$ of General Formula 2 is represented by any one of Formulae (4-1) to (4-4):

(4-1)

*—S—$C_mH_{2m+1}$ (4-2-1)

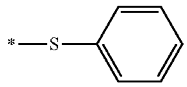

(4-2-2)

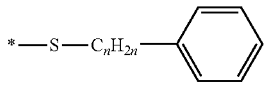

(4-3)

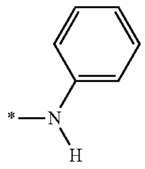

-continued (4-4)

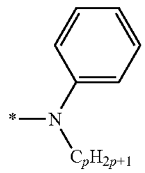

wherein, in Formula (4-1), m is independently an integer of 1 to 6, in Formula (4-2-2), n is independently an integer of 1 to 6, in Formula (4-4), p is independently an integer of 1 to 6, and

* indicates a point linked to another group or structural unit.

7. The triazine ring-containing polymer of claim 1, wherein the General Formula 3-1 comprises a group represented by any one of the formulae below:

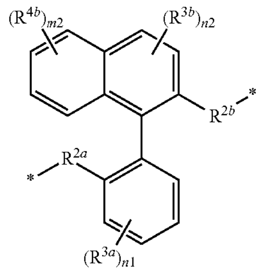

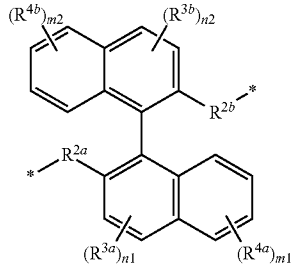

wherein in the formulae, $R^{2a}$, $R^{2b}$, $R^{3a}$, $R^{3b}$, $R^{4a}$, and $R^{4b}$, $n_1$, $n_2$, $m_1$, *, and $m_2$ are the same as in General Formula 3-1.

8. The triazine ring-containing polymer of claim 1, wherein in General Formulae 3-1 to 3-3, the C1 to C10 alkylene group is a methylene group ($—CH_2—$), ethylene group ($—CH_2CH_2—$), trimethylene group ($—CH_2CH_2CH_2—$), propylene group ($—CH(CH_3)CH_2—$), 2-ethylhexamethylene group ($—CH_2CH(CH_2CH_3)CH_2CH_2CH_2CH_2—$), or a combination thereof.

9. The triazine ring-containing polymer of claim 1, wherein in General Formulae 3-1 to 3-3, m of the alkylene oxide group of formula $—(O—C_mH_{2m})_n—$ is an integer of 2, and n is an integer of 1.

10. The triazine ring-containing polymer of claim 1, wherein in General Formulae 3-1 to 3-3, the alkylene oxide group of formula $—(O—C_mH_{2m})_n—$ comprises $—O—CH_2—$, $—O—CH_2CH_2—$, $—O—CH_2CH_2CH_2—$, $—O—CH(CH_3)CH_2—$, $—(O—CH_2)_2—$, $—(O—CH_2CH_2)_2—$, or a combination thereof.

11. The triazine ring-containing polymer of claim 1, wherein the fused aromatic hydrocarbon group in General Formula 3-1, and the aromatic hydrocarbon group in General Formula 3-2 comprise a benzene ring, naphthalene ring, anthracene ring, phenanthrene ring, or a combination thereof.

12. The triazine ring-containing polymer of claim 1, wherein in General Formula 3-1, the fused aromatic hydrocarbon group is a benzene ring or a naphthalene ring, and in General Formula 3-2, the aromatic hydrocarbon group comprise is a benzene ring or naphthalene ring.

13. The triazine ring-containing polymer of claim 1, wherein in General Formulae 3-1 to 3-3, the substituent comprises a C1 to C30 alkyl group, a C1 to C30 alkoxy group, a C6 to C30 aryloxy group, a C1 to C30 secondary or tertiary amino group, cyano group, a C6 to C30 aromatic hydrocarbon group, an heteroaryl group having a C3 to C30 of ring-forming carbon atoms, or a combination thereof.

14. The triazine ring-containing polymer of claim 1, wherein in General Formulae 3-1 to 3-3, the substituent comprises a C1 to C10 alkyl group, a C6 to C12 aromatic hydrocarbon group, or a combination thereof.

15. A thermoplastic resin comprising the triazine ring-containing polymer of claim 1.

16. A thermoplastic article comprising the triazine ring-containing polymer of claim 1.

17. An optical part comprising the triazine ring-containing polymer of claim 1.

18. A triazine ring-containing polymer comprising a repeating unit represented by General Formula 1:

General Formula 1

*-[A-B-]-* wherein, in General Formula 1,

A is represented by General Formula 2,

B is represented by any one of General Formulae 3-1 to 3-3, and

* indicates a point linked to another structural unit or atom;

General Formula 2

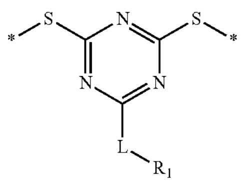

wherein, in General Formula 2,

L is a single bond, a C1 to C6 alkylene group, a divalent C6 to C30 aromatic hydrocarbon group, or an aromatic hydrocarbon linking group in which two or more C6 to C30 aromatic hydrocarbon groups are linked to each other by a single bond, a C1 to C6 alkylene group, or an atom of oxygen, sulfur, or selenium $R_1$ is a group comprising an oxygen atom, sulfur atom, nitrogen atom, selenium atom, or a combination thereof, and

* indicates a point linked to another structural unit or atom;

General Formulae 3-1 to 3-3

(3-1)

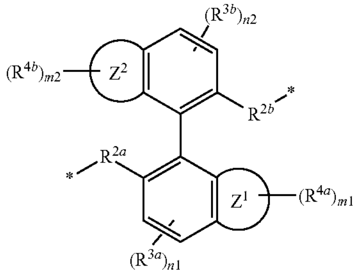

(3-2)

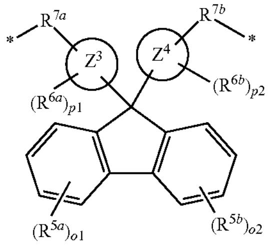

(3-3)

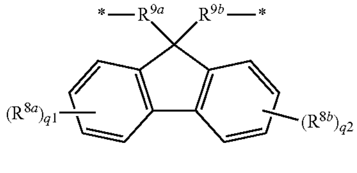

wherein, in General Formula 3-1, $R^{2a}$ and $R^{2b}$ are each independently —$CH_2$ —, —$CH_2CH_2$—, —$CH_2CH_2CH_2$—, —$CH(CH_3)CH_2$—, —$CH_2CH(CH_2CH_3)CH_2CH_2CH_2CH_2$—, —O—$CH_2$—, —O—$CH_2CH_2$—, —O—$CH_2CH_2CH_2$—, —O—$CH(CH_3)CH_2$—, —(O—$CH_2)_2$—, or —(O—$CH_2CH_2)_2$—

$Z^1$ and $Z^2$ are independently hydrogen, or a fused aromatic hydrocarbon group, wherein at least one of $Z^1$ or $Z^2$ is the fused aromatic hydrocarbon group, wherein, $R^{3a}$, $R^{3b}$ , $R^{4a}$ and $R^{4b}$ are each independently a substituent, n1 and n2 are each independently 0, 1, or 2, m1 and m2 are each independently an integer of 0, or any one of 1 to 4, and

* indicates a point linked to another structural unit or atom;

wherein, in General Formula 3-2, $Z^3$ and $Z^4$ are each independently an aromatic hydrocarbon group, $R^{5a}$, $R^{5b}$, $R^{6a}$ and $R^{6b}$ are each independently a substituent, $R^{7a}$ and $R^{7b}$ are each independently —$CH_2$—, —$CH_2CH_2$—, —$CH_2CH_2CH_2$—, —$CH(CH_3)CH_2$—, —$CH_2CH(CH_2CH_3)CH_2CH_2CH_2CH_2$—, —O—$CH_2$—, —O—$CH_2CH_2$—, —O—$CH_2CH_2CH_2$—, —O—$CH(CH_3)CH_2$—, —(O—$CH_2)_2$—, or —(O—$CH_2CH_2)_2$—, o1 and o2 are each independently an integer of 0, or any one of 1 to 4, and p1 and p2 are each independently an integer of 0, or any one of 1 to 4, and

* indicates a point linked to another structural unit or atom; and wherein, in General Formula 3-3, $R^{8a}$ and $R^{8b}$ are each independently a substituent, $R^{9a}$ and $R^{9b}$ are each independently —$CH_2$—, —$CH_2CH_2$—, —$CH_2CH_2CH_2$—, —$CH(CH_3)CH_2$—, —$CH_2CH(CH_2CH_3)CH_2CH_2CH_2CH_2$—, —O—$CH_2$—, —O—$CH_2CH_2$—, —O—$CH_2CH_2CH_2$—, —O—$CH(CH_3)CH_2$—, —(O—$CH_2)_2$—, or —(O—$CH_2CH_2)_2$—, q1 and q2 are each independently an integer of 0, or any one of 1 to 4; and

* indicates a point linked to another structural unit or atom.

19. The triazine ring-containing polymer of claim 18, wherein in General Formulae 3-1 to 3-3, the substituent comprises a C1 to C30 alkyl group, a C1 to C30 alkoxy group, a C6 to C30 aryloxy group, a C1 to C30 secondary or tertiary amino group, cyano group, a C6 to C30 aromatic hydrocarbon group, an heteroaryl group having a C3 to C30 of ring-forming carbon atoms, or a combination thereof.

20. The triazine ring-containing polymer of claim 18, wherein Ri of General Formula 2 is represented by any one of Formulae (4-11 to (4-8):

$$*—S—C_mH_{2m+1} \tag{4-1}$$

(4-2-1)

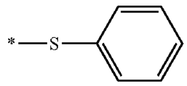

(4-2-2)

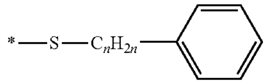

(4-3)

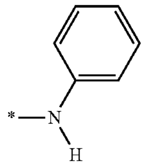

(4-4)

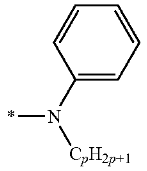

$$*—O—C_mH_{2m+1} \tag{4-5}$$

(4-6)

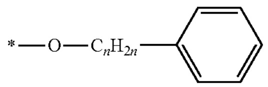

$$*—Se—C_mH_{2m+1} \tag{4-7}$$

(4-8)

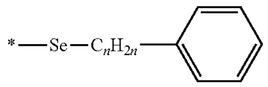

wherein, in Formula (4-1), (4-5), and (4-7), m is independently an integer of 1 to 6, in Formula (4-2-2), (4-6), and (4-8), n is independently an integer of 1 to 6, in Formula (4-4), p is independently an integer of 1 to 6, and

* indicates a point linked to another group or structural unit.

* * * * *